(12) United States Patent     (10) Patent No.: US 11,792,312 B2
Spar     (45) Date of Patent: Oct. 17, 2023

(54) STRETCHY NET HOLDER FOR MOBILE ELECTRONIC DEVICES

(71) Applicant: Red Heeler Group, LLC, Chandler, AZ (US)

(72) Inventor: Linda Spar, Chandler, AZ (US)

(73) Assignee: Red Heeler Group, LLC

( * ) Notice: Subject to any disclaimer, the term of this patent is extended or adjusted under 35 U.S.C. 154(b) by 0 days.

(21) Appl. No.: 17/713,676

(22) Filed: Apr. 5, 2022

(65) Prior Publication Data

US 2022/0321688 A1    Oct. 6, 2022

Related U.S. Application Data

(60) Provisional application No. 63/170,741, filed on Apr. 5, 2021.

(51) Int. Cl.
*H04M 1/00* (2006.01)
*H04M 1/02* (2006.01)

(52) U.S. Cl.
CPC .................. *H04M 1/0279* (2013.01)

(58) Field of Classification Search
CPC .................................................. H04M 1/0279
See application file for complete search history.

(56) References Cited

U.S. PATENT DOCUMENTS

| | | |
|---|---|---|
| D606,986 S | 12/2009 | de Jong |
| 7,954,207 B2 | 6/2011 | Fatemi |
| D671,932 S | 12/2012 | Azoulay |
| D687,427 S | 8/2013 | Peterson |
| D706,256 S | 6/2014 | Ward et al. |
| D720,736 S | 1/2015 | Chen et al. |
| 9,219,516 B2 | 12/2015 | Haymond |
| 9,314,078 B1 | 4/2016 | Haymond et al. |
| D764,451 S | 8/2016 | Hung et al. |
| 2006/0059628 A1* | 3/2006 | Hamilton ............... A47C 4/52 5/653 |
| 2012/0063066 A1* | 3/2012 | Floit ..................... A45F 3/14 361/679.01 |
| 2016/0105209 A1 | 1/2016 | Dunn et al. |
| 2018/0159579 A1 | 6/2018 | Garcia |
| 2018/0183481 A1* | 6/2018 | Weaver ............... H04M 1/0202 |

(Continued)

FOREIGN PATENT DOCUMENTS

| | | | |
|---|---|---|---|
| CN | 102763960 | * 11/2012 | ............. H04M 1/02 |
| CN | 202663452 | * 1/2013 | ............. H04M 1/02 |
| CN | 204305107 U | 4/2015 | |

(Continued)

*Primary Examiner* — Pakee Fang
(74) *Attorney, Agent, or Firm* — Dentons Cohen & Grigsby P.C.

(57) ABSTRACT

A stretchable net cover for a mobile electronic device that provides multiple grasp points and configurations, providing a user with a plurality of ways to hold and use their devices. A user may slide one or more fingers through openings in the netting material to grasp the device, may slide the netting over a forearm, or may hook the device to a purse, belt loop, carabiner, lanyard, retractable or static leash via the netting material. The cover may be provided as an add-on, i.e., designed for use over a mobile electronic device alone or a device enclosed within a case, or may be provided as part of a case for a mobile electronic device.

11 Claims, 10 Drawing Sheets

(56) References Cited

U.S. PATENT DOCUMENTS

2019/0363747 A1* 11/2019 Gil Vera .............. H04B 1/3888

FOREIGN PATENT DOCUMENTS

| | | | | | |
|---|---|---|---|---|---|
| CN | 205792831 | * | 12/2016 | .............. | H04M 1/18 |
| CN | 205987035 U | | 2/2017 | | |
| CN | 107659697 | * | 2/2018 | .............. | H04M 1/18 |
| CN | 208539974 U | | 2/2019 | | |
| CN | 209017096 U | | 6/2019 | | |
| CN | 210988682 U | | 7/2020 | | |
| CN | 107087048 | * | 8/2022 | .............. | H04M 1/18 |
| GB | 2515397 B | | 2/2015 | | |
| JP | 3212380 U | | 9/2017 | | |
| KR | 101753173 B1 | | 7/2017 | | |
| WO | 2014207647 A1 | | 12/2014 | | |
| WO | 201841765 A1 | | 3/2018 | | |

* cited by examiner

STRETCHY NET HOLDER FOR MOBILE ELECTRONIC DEVICES

CROSS REFERENCE TO RELATED APPLICATIONS

The present application claims priority to U.S. Provisional Patent Application Ser. No. 63/170,741, filed Apr. 5, 2021, which is incorporated herein in its entirety.

TECHNICAL FIELD OF THE INVENTION

The embodiments relate generally to an attachment for a mobile electronic device, such as a stretchy net configured to fit around a mobile electronic device to provide expanded options for securely holding the device.

BACKGROUND OF THE INVENTION

The mobile phone or smartphone, like the Apple iPhone and the Samsung Galaxy, has evolved from a simple cellular phone absent a camera and basic SMS functions to a ubiquitous device that not only provides voice communication, but functions in daily work and personal life through the use of apps such as email, social media, internet of things, and video chat via cellular, internet, and wide area networks. Most people view their phones as an extension of themselves, their offices, companies, and smart homes, and panic if they cannot quickly locate their device in a pocket, purse, or bag.

Women slip phones under bra straps or yoga pant waistbands. Men carry their mobile phones in bulky cases attached to belts. Phones work their way to the bottom of purses and backpacks. They are dropped and cracked as we search for them, pull them out of bags and pockets and briefcases. People may leave them behind during a "quick trip" down the stairs to the basement or garage or outside to the mailbox because they have no pockets. In the event of a slip or fall, they would have no easy means of calling for help.

For years the world population has simply accepted the practice of cradling or holding such a vital extension of their existence in their hands. Until recently, cases for such devices have only focused on protecting the phone from moisture damage or impact damage, such as from dropping the phone onto the floor or ground. Most cases are of smooth or rugged design, but still require the user to hold the phone—at times precariously—while using it in a crowd or leaning over a ledge, railing, window or building to take a photo or selfie. A few adhesive ad-ons, like a PopSocket, ring, or strap are available. More recently, longer "leashes" that loop through a case enclosing the phone have become available. However, these items very often don't solve the problem of dropping the phone, especially if you are jostled. The phone can slip between fingers with a PopSocket. When held by one finger in the commonly used ring and loop attachments, that one finger can slip or rotate out of the inflexible loop or ring. Most importantly, these holders can fall off the phone if they are not integrated with a case, since the adhesive dries, wears, weakens or becomes wet or dirty.

Cases have been designed to cure this deficiency by integrating holding or carrying straps with the case. For example, U.S. Design Pat. Nos. D687,427, D764,451, and D671,932; UK Pat. No. GB2515397; U.S. Pat. Application Pub. No. 2018/0159579 and 2019/0363747; U.S. Pat. Nos. 9,314,078 and 9,219,516; International Pat. Pub. No. WO 2018/041765; Korean Pat. No. KR101753173; and Chinese Pat. Nos. CN209017096U, CN210988682U, and CN205987035U each disclose phone cases that include one or more thick bands of material as part of a case of the device. While these bands of material are indicated to be useful for holding the phone, they provide the user with limited access options and holding configurations, i.e. they only allow a user to grasp the phone in one orientation of the phone and/or user's hand. Moreover, many of these disclosures also do not provide a means to attach accessories or carry additional items, such as a user's credit cards, money, or keys, within the bands of material as they are spaced two widely or are not provided in sufficient quantity.

A case providing a webbing of flexible material that could cure some of these deficiencies is disclosed in Chinese Pat. No. CN208539974U. However, while the webbing offers increased grasp points for a user's hands and/or fingers, it is provided on only a small portion at the back of the case and includes widely spaced webbing, limiting its overall usefulness. Additional examples of flexible webbing are shown in U.S. Pat. Application Pubs. 2016/0105209, U.S. Pat. No. 7,954,207, U.S. Design Pat. D706,256, and Chinese Pat. No. CN204305107U. The bands of material, however, are provided to help dissipate heat from the device or to protect the device from impact damage and thus are not configured to assist gripping or holding the device.

Accordingly, a need exists for improved methods for grasping or holding a mobile electronic device such as a smart phone so that is may be more safely used.

SUMMARY OF THE INVENTION

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

The presently disclosed invention relates to a stretchable net cover for a mobile electronic device that provides multiple grasp points and configurations, providing a user with a plurality of ways to hold and use their devices. For example, a user may slide one or more fingers through openings in the netting material to grasp the device, may slide the netting over a forearm, or may hook the device to a purse, belt loop, carabiner, lanyard, or retractable or static leash via the netting material. The cover may be provided as an add-on, i.e., designed for use over a mobile electronic device alone or a device enclosed within a case, or may be provided as part of a case for a mobile electronic device.

Accordingly, the presently disclosed invention provides a cover comprising a body formed of a flexible netting material, wherein the netting material is configured to cover a back, sides, and at least a portion of a front of a mobile electronic device, and a frame having a top edge, a bottom edge, and opposing side edges that define an opening in the body configured to expose a front screen region of the mobile electronic device. The body and frame each comprise a flexible material configured to provide removeable attachment of the cover over the mobile electronic device. Moreover, the flexible netting material is configured to accept a user's fingers or other body part (e.g., wrist, forearm) through mesh openings.

The body and frame are generally configured to provide removeable attachment of the cover over a range of sizes of mobile electronic devices, such that small increases or decreases in the length, width, or thickness of the device, or addition of a case on the mobile electronic device, may be accommodated by the same cover.

The stretchable net cover provides at least two configurations, including: (i) an initial configuration in which the cover is separated from the mobile electronic device, wherein the top, bottom, and side edges of the frame have a first overall dimension, and the body is unstretched, and (ii) an installed configuration in which the cover is positioned around the mobile electronic device so that the body is stretched about the back and sides of the mobile electronic device, and the top, bottom, and side edges of the frame have a second overall dimension substantially the same as the first overall dimension.

The netting material may comprise a flexible material and the frame may comprise a thickened region of the netting material. The body and the frame may comprise the same or different flexible materials. Moreover, the body of the cover may include one or more netting designs, i.e., the shape, size, and configuration of the openings in the netting material may vary over different regions of the cover.

The netting material may have a webbing thickness (i.e., thickness as measured perpendicular to the longitudinal axis of the cover) of 1 mm to 5 mm, and/or mesh or netting openings with a diameter (i.e., width as measured along the longitudinal or lateral axis of the cover) of 0.5 cm to 7.5 cm, preferably 2 cm to 5.5 cm. The mesh openings may vary in size across a longitudinal or lateral extent of the body portion, such as larger or smaller in regions positionable adjacent a top of the mobile electronic device.

The netting material is generally flexible, such as formed of a flexible elastic webbing or flexible polymeric material formed into a webbing. Exemplary polymeric materials have a durometer of 40A to 65A (Shore A hardness), such as thermoplastic elastomers (natural and synthetic rubbers, silicones, polydimethylsiloxane (PDMS) or silicone rubber, poly(butyl methacrylate), thermoplastic polyurethane resin (TPU), styrenics, copolyesters, polyurethanes, polyamides, polyolefin blends, polyolefin alloys, polyolefin plastomers and elastomers (e.g., very low molecular weight, linear low-density polyethylene).

The cover may generally be configured to cover a cellular phone, a tablet computer, an electronic gaming system, a digital music player, a global positioning system, and combinations thereof. The cover may also be configured to fit over a case that encloses a cellular phone, a tablet computer, an electronic gaming system, a digital music player, or a global positioning system. In general, the cover may be flexible enough to accommodate the mobile electronic device when positioned in a case and when removed from the case.

The frame of the cover may be shaped to be coincident with a shape of the front screen region of the mobile electronic device. Moreover, portions of the flexible netting material of the body may be specifically designed to accommodate access points on the mobile electronic device when the cover is installed therein or may be removeable to accommodate access points on the mobile electronic device when the cover is installed therein.

The presently disclosed invention also provides a case comprising a body portion having a side wall configured to extend around a perimeter of a mobile electronic device, the side wall having a front perimeter lip extending from the side wall and positionable adjacent a front screen portion of the mobile electronic device and a rear perimeter; and a flexible netting material attached along either the front perimeter lip or rear perimeter of the body portion and extending about a back side thereof. The body portion and flexible netting material may be configured to provide removeable attachment of the case about the mobile electronic device such that the front screen portion is substantially uncovered. Moreover, the flexible netting material is configured to accept a user's fingers or other body part (e.g., wrist, forearm) through mesh openings.

The case may further include a back panel extending from the rear perimeter of the body portion, wherein the flexible netting is disposed over the back panel. The netting material may comprise a flexible polymer, such as described hereinabove (i.e., any of the exemplary polymeric materials listed above). The sidewall may comprise a flexible polymer that is the same or different than the flexible polymer of the netting material. Alternatively, the side wall and/or backwall may be formed of a less flexible polymeric material, such as a material having a durometer of greater than 60A (shore A) or at least 20D (shore D).

The netting material may have a webbing thickness (i.e., thickness as measured perpendicular to the longitudinal axis of the cover) of 1 mm to 5 mm, and/or mesh or netting openings with a diameter (i.e., webbing diameter, width as measured along the longitudinal or lateral axis of the cover) of 0.5 cm to 7.5 cm, preferably 2 cm to 5.5 cm. The mesh openings may vary in size across a longitudinal or lateral extent of the body portion, such as larger or smaller in regions positionable adjacent a top of the mobile electronic device.

The case may generally be configured as a case for a cellular phone, a tablet computer, an electronic gaming system, a digital music player, a global positioning system, and combinations thereof. Portions of the flexible netting material and/or the body portion may be removed to accommodate access points on the mobile electronic device when the case is installed therein.

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the present invention, unless stated to be otherwise, are not necessarily drawn to scale.

DETAILED DESCRIPTION

In the following description, the present invention is set forth in the context of various alternative embodiments and implementations involving stretchy net covers or cases for mobile electronic devices. The embodiments disclosed herein will change and advance the method by which we "wear" these computers and will become increasingly valuable as the Internet of Things and wearable technologies advance and internet technology rapidly migrates to 5G, rendering mobile electronic devices nearly indispensable.

Various aspects of the covers and cases may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the systems, methods, covers, and cases disclosed herein may be illustrated with reference to one or more exemplary implementations. As used herein, the term "exemplary" means "serving as an example, instance, or illustration," and should not necessarily be construed as preferred or advantageous over other variations of the systems or methods disclosed herein. "Optional" or "optionally" means that the subsequently described event or circumstance may or may not occur, and that the description includes instances where the event occurs and instances where it does not.

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Certain terminology is used in the following description for convenience only and is not limiting. The words "lower," "upper," "bottom," "top," "front," "back," "left," "right" and "sides" designate directions in the drawings to which reference is made but are not limiting with respect to the orientation in which the various parts of the needle or any assembly of them may be used.

It must also be noted that as used herein and in the appended claims, the singular forms "a", "an", and "the" include the plural reference unless the context clearly dictates otherwise. Thus, for example, reference to "a" netting, "an" elastomeric material, or "the" cover, is a reference to one or more of each and equivalents thereof known to those skilled in the art, and so forth. Unless defined otherwise, all technical and scientific terms used herein have the same meanings as commonly understood by one of ordinary skill in the art.

"Substantially the same", as used herein, is understood to mean that two values or measurements are within 30% of each other, such as within 20% of each other, or within 10% of each other, or even within 5% of each other. Where it is indicated that two values are the same as each other is understood to mean that two values or measurements deviate from one another by less than 5%, or even less than 2%.

The term "mobile electronic device" is used broadly herein to refer to a portable, handheld, electronic device, such as a cell or cellular phone or smart phone; a global positioning system (GPS) system; a digital music player (MP3 player, iPod® or the like); an electronic gaming system (Nintendo® DS; PSP®; etc.); a camera; a remote control; a personal digital assistant (PDA); a radio; a two-way radio; a citizens band radio; a walkie-talkie; a video recorder; a cassette player and/or recorder; a mini-cassette recorder; a DVD player; a portable television; a digital camera; a video camera; a portable computer (laptop computer, iPad®, tablet, or the like); a digital media player or tablet computer (such as an iPad® or the like); a radar detector; an e-book or e-reader (Kindle®, Nook®, iPad®, Sony Reader™, or the like), a television (TV) remote control, a remote control, a calculator, test equipment, monitoring equipment, medical devices, etc.

Mobile electronic devices have become ubiquitous and are generally considered essential components of modern life. For example, smart, rectangular, internet-connected phones like the Apple iPhone and Google Android have become essential communication devices. Previously, flip phones, "candy bar" phones, and Palm and Treo devices were not used with the frequency that phones are used today. They were smaller, of varying design, and were mostly used secondarily to landlines, since cell service could still be unreliable. Few had cameras. The applications contained on the devices were primitive. Some phones did have antennas around which a loop could be affixed, and some did come with leather cases worn attached to your belt.

The size and shape of modern electronic devices, however, renders them more difficult to hold and carry. None include antennas and most, if not all, are poorly configured to be carried on a user's belt. The covers and cases disclosed herein provide comfortable, strong, yet stretchy net materials that help solve these problems. A user may hook one or more fingers through mesh openings in the net material to hold and/or carry the mobile electronic device, thus allowing the user to secure the device to a hand like a glove. The user may even slide a hand and/or forearm through the mesh openings in the net material to secure the phone thereon, providing extended use configurations and even expanding the user base. For example, a user having mobility issues of their hands and/or fingers such as arthritis, or even a person missing finger(s) or a hand, could still hold and carry a device using the inventive covers and cases disclosed herein.

When provided as a cover, the present invention may be used over a mobile electronic device already housed within a case, or may cover a "naked" device, i.e., a device not housed within a case. As such, the cover provides an attractive add-on that expands the functionality of a user's current mobile electronic device configuration, i.e., the user does not have to purchase a new case. The stretchiness of the cover may also allow a user to reuse the same cover on a range of similarly sized devices, or on the same device included with or without a case.

The inventive covers and cases provide further holding and carrying possibilities by permitting attachment of hooks, carabiners, and the like to hook the mobile electronic device to a purse, belt loop, lanyard, or retractable or static leash. For example, it could be hooked to a room or shower door with a simple "S" hook. Moreover, the inventive covers and cases provide means to carry items such as credit and ID cards, wired or wireless earbuds, tissues, lip balm, keys, and the like inside the flexible net material, or access an adhesive card wallet or pouch stored therein. Attachment elements may be hooked to the mesh to provide attachment of additional items on an outside of the mesh, such as a hook to hold a face mask or keys, charms, or the like.

Additional standard accessories may be included, or previously attached accessories may remain. For example, the flexible netting material may accommodate accessories such as a PopSocket, ring, or phone stand through the mesh openings. The mesh openings may be arranged to accommodate a wide range of configurations and functionality, or may be trimmed to accommodate the wide range of configurations and functionality as will be discussed hereinbelow.

The inventive covers and cases also provide for a range of personalization options, such as inclusion of logos on the netting or on charms attached thereto, e.g., school or company logos, and even manufacturing the covers and cases in a wide range of colors.

The inventive covers and cases may be formed of stretchable polymeric materials that are easily washed and sanitized. That is, at least the netting material of the covers and cases is formed of a flexible elastic webbing or flexible polymeric material formed into a webbing. Exemplary polymeric materials have a durometer of 40A to 65A (Shore A hardness), such as at least 40A, at least 45A, at least 50A, at least 55A; or up to 65A, or up to 60A, or up to 55A, or up to 50A, or any combination of lower and upper limit of Shore A hardness (e.g., from 40A to 60A, etc.). Exemplary flexible materials include thermoplastic elastomers, such as natural and synthetic rubbers, silicones, polydimethylsiloxane (PDMS) or silicone rubber, poly(butyl methacrylate), thermoplastic polyurethane resin (TPU), or combinations thereof. Further exemplary thermoplastic elastomers include styrenics (styrenic block copolymers), copolyesters, vulcanizates, polyurethanes, polyamides, polyolefin blends, polyolefin alloys, polyolefin plastomers and elastomers (e.g., very low molecular weight, linear low-density polyethylene).

According to certain aspects, various portions on the covers and cases disclosed herein, such as the netting material, may be antimicrobial or may comprise an antimicrobial additive. Exemplary antimicrobial materials include antimicrobial polymers prepared from nitrogen- and/or phosphorus-functionalized monomers. Additional exemplary antimicrobial materials include antimicrobial polymers comprising any of the polymeric materials disclosed herein and an antimicrobial agent such as elemental silver, silver oxides, silver salts, silver ion exchange compounds, silver zeolites, silver glasses, and mixtures thereof. Specific examples of antimicrobial agents include silver zeolite, silver zirconium phosphate, silver nitrate, silver thiosulfate, silver sulphadiazine, silver fusidate, silver acetate, silver bromide, silver carbonate, silver chlorate, silver chloride, silver citrate, silver fluoride, silver iodate, silver lactate, silver nitrite, silver perchlorate, silver sulfide.

Preferred polymeric materials include silicone, fluorosilicone, silicone rubber, thermoplastic volcanizates, thermoplastic polyurethane, and antimicrobial versions of the same comprising an antimicrobial agent or additive such as silver nanoparticles or silver ion-based agents.

The inventive covers and cases disclosed herein offer additional advantages beyond easy cleaning and sanitizing; they may further allow wireless charging of a mobile electronic device, such as on any of the wireless chargers known and used in the art. That is, when a mobile electronic device having a cover or case of the present disclosure positioned thereon is placed on a wireless charging pad or station, the cover and/or the case may not interfere with wireless charging of the device.

The netting material of the inventive covers and cases can be trimmed, either by a user or as a manufacturing step to provide access to various buttons, cameras, and access points (e.g., wired charging port, audio input/output, USB ports, etc.) of a mobile electronic device contained therein. Alternatively, the covers and/or cases disclosed herein may be configured to provide access to various buttons, cameras, and access points (e.g., wired charging port, audio input/output, USB ports, etc.) of a mobile electronic device contained therein (i.e., manufactured de novo in specific configurations).

A top edge and/or one or both side edges of the netting material, such as along edges that are coincident with top, bottom, or side edges of the mobile electronic device being covered or encased, may include a larger opening to provide access openings, such as for insertion of items like credit cards, small papers, etc. Alternatively, the larger opening may be positioned at a point along the back of the cover or case in either a longitudinal or lateral direction. The larger opening may be formed upon manufacture, or may be formed by a user, e.g., slitting the netting material. The netting material may alternatively be designed to have a zip-loc type opening at the top or side(s) edges or along the back side to provide access.

The inventive covers and cases may be attachable to a mobile electronic device by inserting the device through the opening in the cover or case or sliding the cover over the device if manufactured with an open top or side.

Figure 11:
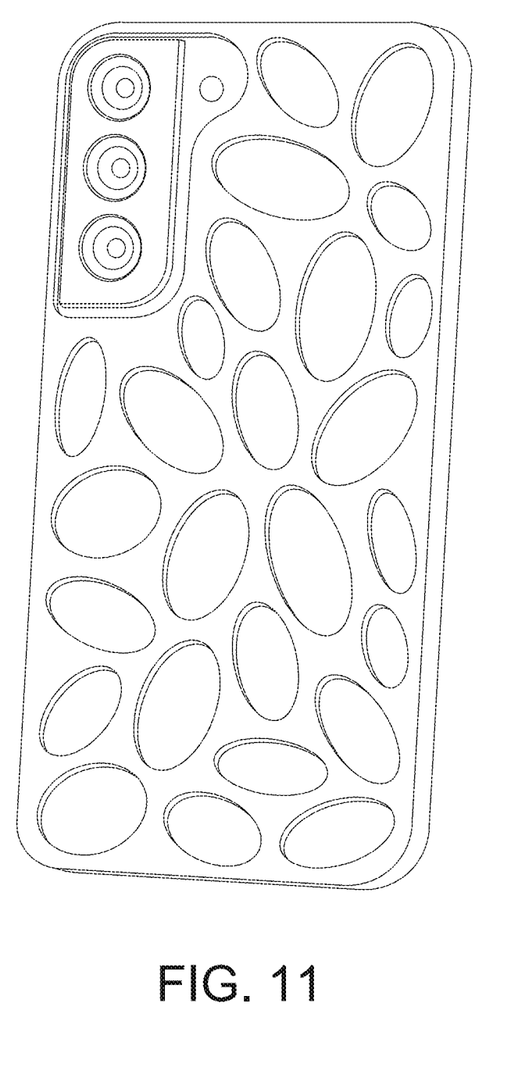
Figure 12:
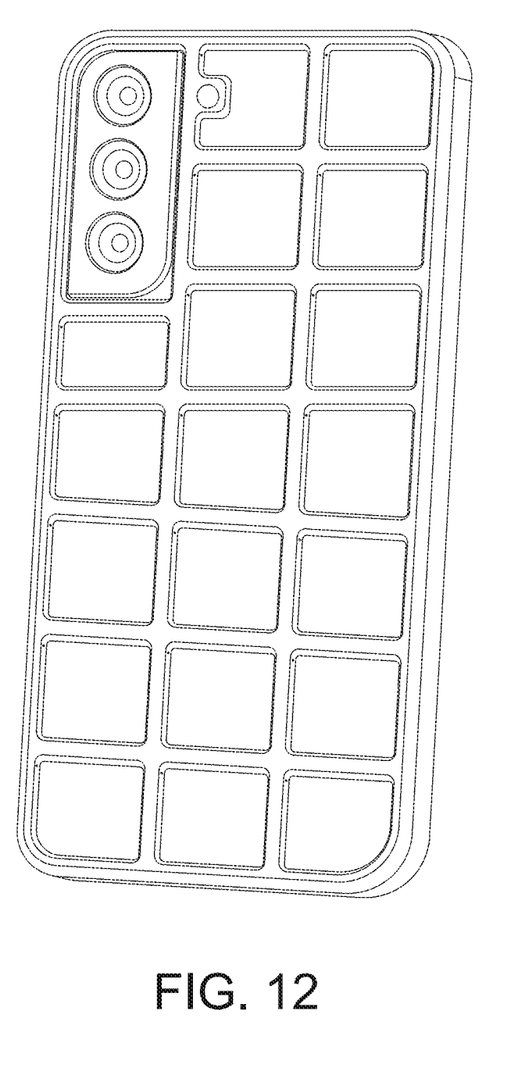
Figure 13A:
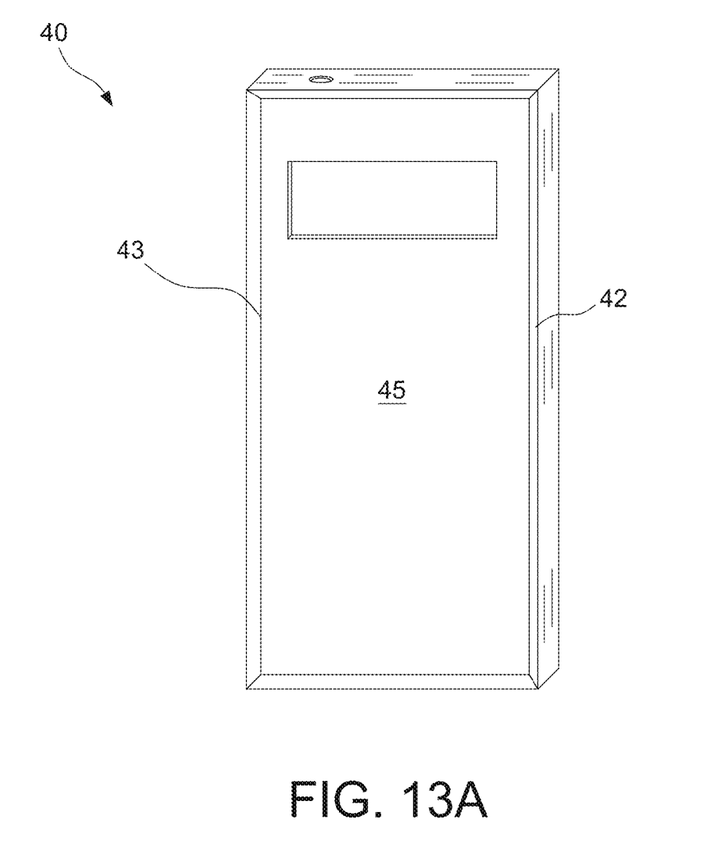
FIGS. 13A and 13B illustrate front and back views, respectively, of a case according to aspects of the present disclosure.
Figure 13B:
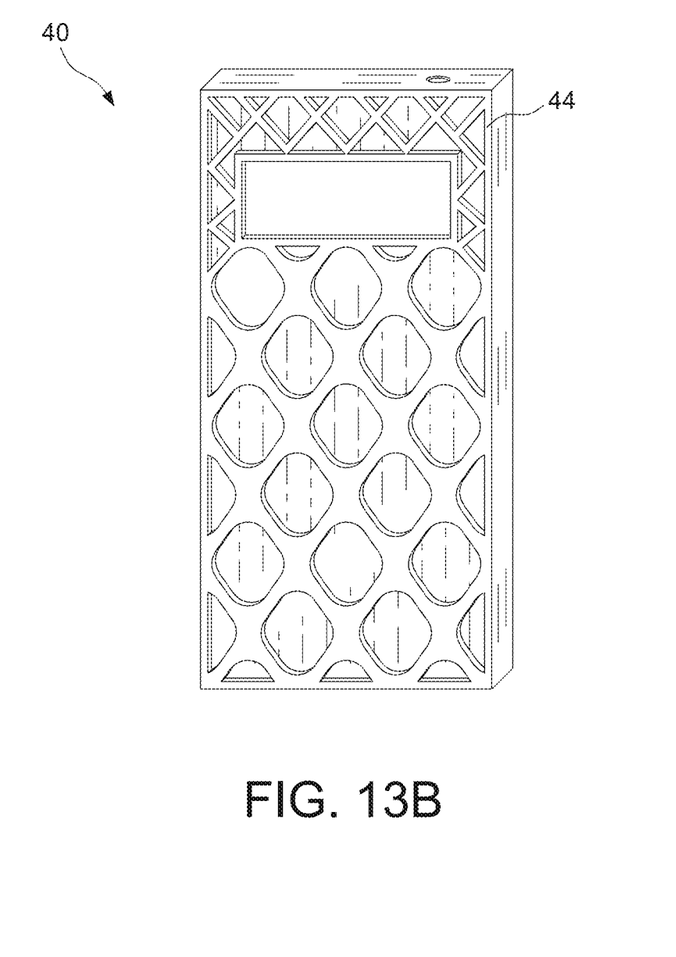

With reference now to the figures, exemplary covers according to aspects of the presently disclosed invention are illustrated in FIGS. 1-12 and an exemplary case is illustrated in FIG. 13.

Figure 1:
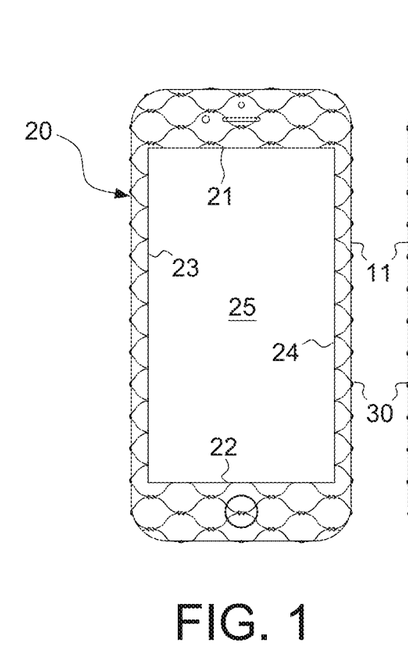
FIG. 1 illustrates a front view of a stretchable net cover according to aspects of the present disclosure, shown positioned on mobile electronic device.
Figure 2:
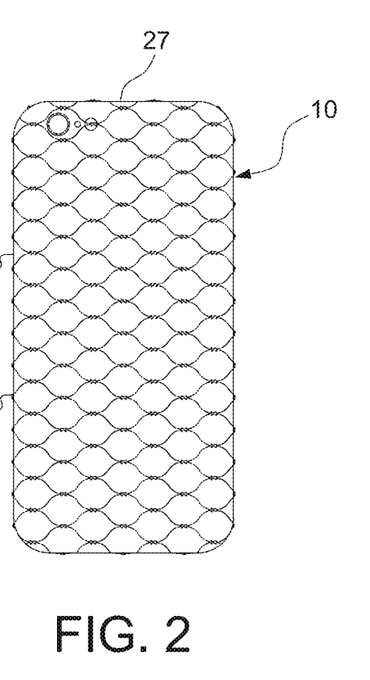
FIG. 2 illustrates a back view of the stretchable net cover of FIG. 1 shown positioned on a mobile electronic device.

With specific reference to FIGS. 1-6, shown is a cover according to aspects of the present disclosure removeably attached about a mobile electronic device, e.g., a mobile phone. The cover generally comprises a body 10 of flexible netting material 11, wherein the netting material is configured to cover a back (see FIG. 2), sides (see FIGS. 3-6), and at least a portion of a front of a mobile electronic device (see FIG. 1). The cover further comprises a frame 20 having a top edge 21, a bottom edge 22, and opposing side edges (23, 24) that define an opening 25 in the body configured to expose a front screen region of the mobile electronic device. Shown in FIGS. 1 and 2 are connection points 30 for the netting material 11, which may include thickened regions of the polymeric materials, e.g., silicone, or knots connecting individual strands of the netting material.

The body 10 and frame 20 each comprise a flexible material configured to provide removeable attachment of the cover over the mobile electronic device. For example, a user may slide the device through the front opening 25 defined by the frame 20 and stretch the body 10 around the device so that the frame 20 is substantially coincident with edges of the front display screen of the device. Alternatively, the body 10 of the cover may include an opening, such as an opening of the netting material adjacent one end of the body 10, i.e., nearest to one of the edges (21-24) of the frame, such as nearest to the region of netting that would be adjacent a top end 27 of the covered mobile electronic device. The mobile electronic device may be slipped through the opening so that the cover encases the device with the frame 20 coincident with edges of the front display screen thereof.

Accordingly, the inventive cover may have at least two configurations. A first initial configuration, which may include the cover separated from the mobile electronic device, wherein the top, bottom, and side edges of the frame have a first overall dimension, and the body is unstretched. A second installed configuration, which may include the cover positioned around the mobile electronic device so that the body is stretched about the back and sides of the mobile electronic device, and the top, bottom, and side edges of the frame have a second overall dimension (as shown in FIGS. 1-6). According to certain aspects, the frame may be stretched when removeably attaching the cover to a mobile electronic device, i.e., while the cover is not in either of first or second configurations, but the first and second overall dimensions of the frame are generally substantially the same or are the same.

Figure 3:
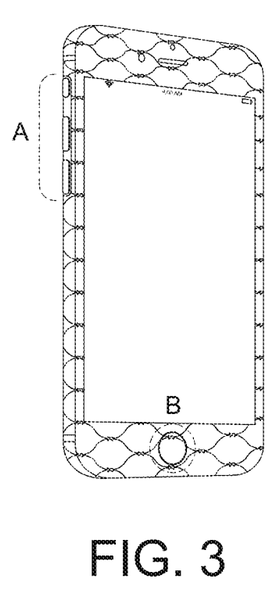
FIG. 3 illustrates a front perspective view of the stretchable net cover of FIG. 1 shown positioned on a mobile electronic device.
Figure 4:
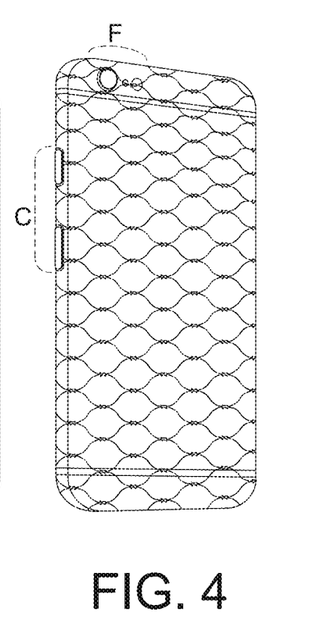
FIG. 4 illustrates a back perspective view of the stretchable net cover of FIG. 1 shown positioned on a mobile electronic device.
Figure 5:
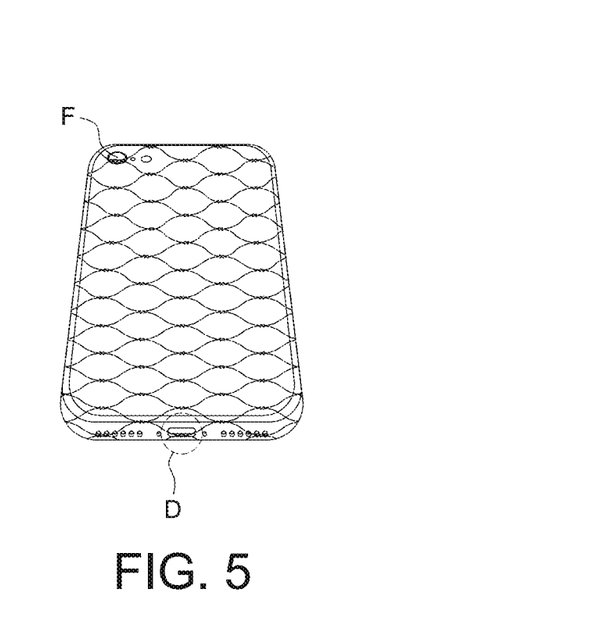
FIG. 5 illustrates a bottom perspective view of the stretchable net cover of FIG. 1 shown positioned on a mobile electronic device.
Figure 6:
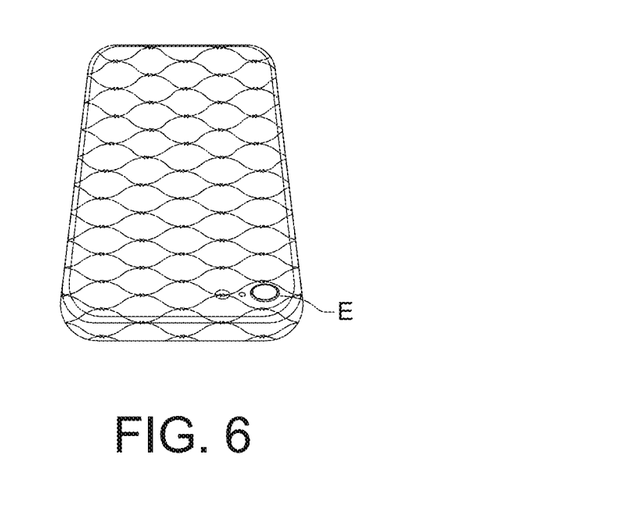
FIG. 6 illustrates a top perspective view of the stretchable net cover of FIG. 1 shown positioned on a mobile electronic device.

The netting material 11 of the body 10 may be pushed aside by a user to gain access to various buttons or ports on a mobile electronic device contained within the cover. Alternatively, or in addition, the netting material 11 may be removed after manufacture, such as by a user, to accommodate various access points on a mobile electronic device contained within the cover. For example, sections of the netting may be removed (A, B, C; FIGS. 3, 4) to provide unobstructed access to buttons on the mobile electronic device, or for a camera (E, F; FIG. 4, 6) on the mobile electronic device. As shown in FIG. 5, sections of the netting may be removed (D) to provide unobstructed access to a charging port.

When the cover is manufactured without openings configured for specific devices, the user may alter the cover. For example, after the cover is removeably attached to the device, the netting material may be snipped or adjusted to customize it to the device, such as to a specific model of a phone. That is, small areas of the netting can be cut to better allow for use of a rear camera, function buttons and switches on the side, a front camera, and/or touch ID sensor. Charging the device via a lightning or similar charger can be accomplished by slightly pulling the netting out of the way, or by snipping a small opening as described.

The cover may be manufactured to accommodate specific configurations of mobile electronic devices. As such, the cover may include openings that provide unobstructed access to buttons, cameras, and other ports on the mobile electronic device, wherein the openings are arranged based on the specific device configurations. Exemplary configurations are shown in FIGS. 9-12.

Figure 7:
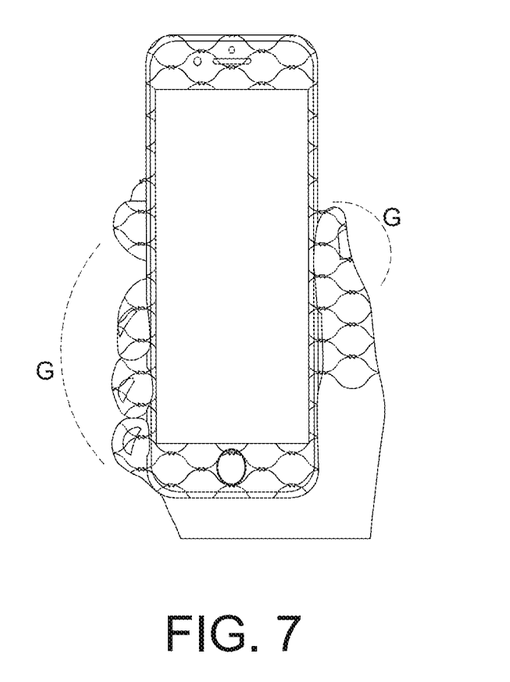
FIG. 7 illustrates a front view of the stretchable net cover of FIG. 1 shown positioned on a mobile electronic device with a user's fingers looped through netting of the stretchable net cover.
Figure 8:
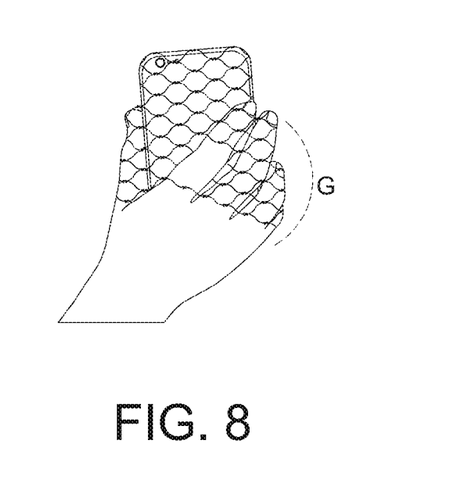
FIG. 8 illustrates a back view of the stretchable net cover of FIG. 1 shown positioned on a mobile electronic device with a user's fingers looped through netting of the stretchable net cover.

With specific reference to FIGS. 7 and 8, the netting of the body portion of an inventive cover or case allows numerous, easy methods for a user to grip a mobile electronic device. A user's fingers are shown engaged within the netting material, wherein the netting material comprises a sufficient stretch to allow the user to comfortably hold the device (see netting region G). Moreover, the netting allows the user to adjust their grip, e.g., change the number of fingers used to grip and/or the position on the device that is gripped, thus reducing hand fatigue.

While the material is flexible, it is also resilient and will reform on the encased or covered device when the user releases the netting. Exemplary materials having such resilience include any of the polymeric materials listed hereinabove, such as at least the elastomeric polymers silicone, polydimethylsiloxane (PDMS) or silicone rubber, poly(butyl methacrylate), natural or synthetic rubber, thermoplastic polyurethane resin (TPU), or combinations thereof.

The body 10 and frame 20 may comprise the same flexible material. For example, the frame may comprise a thickened region of the flexible material. Alternatively, the frame may comprise a different material than the body, such as a less flexible or less stretchable material to enhance the ability of the frame to maintain a specific shape and dimensional configuration. As example, the netting material may comprise a polymeric material having a durometer of 40A to 65A (Shore A hardness) as indicated hereinabove, and the frame may comprise a polymeric material having a durometer of at least 50A (Shore A hardness), such as at least 55A, at least 60, at least 65A, at least 70A; or up to 75A, up to 70A, up to 65A, up to 60A, up to 55; or any combination of lower and upper limit of Shore A hardness (e.g., from 50A to 70A, etc.). For example, the frame may have a Shore D hardness of at least 20D, such as at least 25D, at least 30D, at least 35D, at least 40D, at least 45D, at least 50D, at least 55D; or up to 60D, up to 55D, up to 50D, up to 45D, up to 40D, up to 35D, or up to 30D, or up to 25D; or any combination of upper and lower limit of Shore D hardness.

The netting material may have a webbing thickness (i.e., thickness as measured perpendicular to the longitudinal axis of the cover) of 1 mm to 7 mm, such as at least 1 mm, at least 2 mm, at least 3 mm, at least 4 mm; or up to 7 mm, up to 6 mm, up to 5 mm, up to 4 mm, up to 3 mm; or any combination of upper and lower thicknesses (e.g., webbing thickness of 2 mm to 6 mm, or 2 mm to 4 mm, etc.). As indicated above, the thickness of the netting material (i.e., webbing thickness) may be the same or different as the thickness of the frame. According to certain aspects, the frame material may be thicker than the webbing thickness. As such, the frame thickness may be 2 mm to 7 mm, such as at least 2 mm, at least 3 mm, at least 4 mm; or up to 7 mm, up to 6 mm, up to 5 mm, up to 4 mm, up to 3 mm; or any combination of lower and upper thicknesses. A thicker frame region may enhance the protective capabilities of the covers disclosed herein.

The webbing thickness may vary in the body portion of the cover, such as across a longitudinal extent of the body (i.e., from a top to a bottom when positioned on a mobile electronic device). Moreover, the netting material may have a webbing thickness configured for a size of the device it is intended to cover, and additionally configured to provide comfort for the user.

The netting material of the body 10 may include a mesh configured to allow a user to engage one or more fingers within the mesh openings. For example, an exemplary inner diameter of individual mesh or netting openings (i.e., webbing diameter; width as measured along the longitudinal or lateral axis of the cover) may be 0.5 cm to 7.5 cm, such as at least 0.5 cm, at least 1 cm, at least 2 cm, at least 3 cm, at least 4 cm, at least 5 cm; or at least 6 cm, or up to 7.5 cm, up to 7 cm, up to 6 cm, up to 5 cm, up to 4 cm, up to 3 cm, or up to 2 cm; or any combination of lower and upper diameters (e.g., 2 cm to 5.5 cm, 2 cm to 5 cm, etc.).

The mesh openings, i.e., webbing diameter, may vary in size across a longitudinal or lateral extent of the body portion, such as larger or smaller in regions positionable adjacent a top of the mobile electronic device. Moreover, the netting material may have a webbing diameter configured for a size of the device it is intended to cover, and additionally configured to provide comfort for the user.

Figure 9:
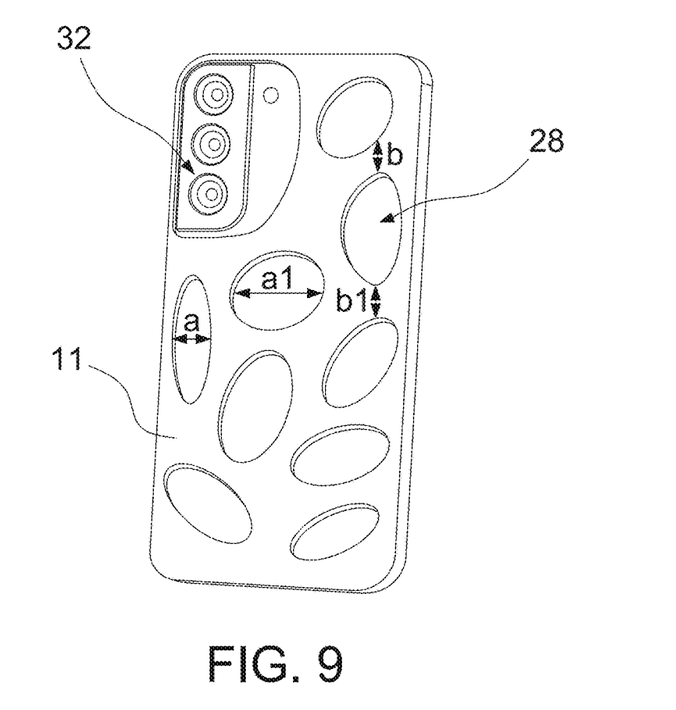
FIGS. 9-12 illustrate back views of a stretchable net cover according to aspects of the present disclosure positioned on a mobile electronic device.
Figure 10:
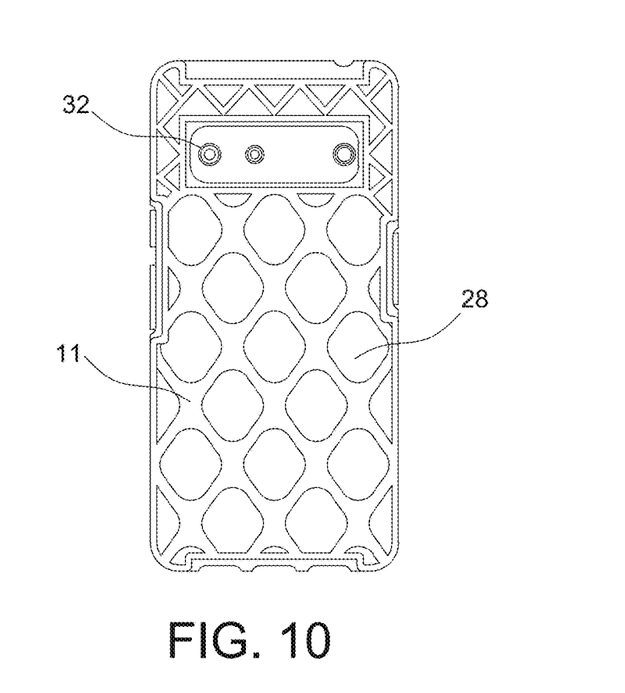

Illustrated in FIGS. 9-12 are various designs for the webbing of the presently disclosed cover or case (see below for description of a case). As shown in FIGS. 9 and 11, the netting material 11, also referred to as webbing, may be formed such that the size and shape of the openings in the material is irregular (e.g., distances 'a' and 'a1' in FIG. 9), and the amount of material disposed between openings may vary in a single cover (e.g., distances 'b' and 'b1' in FIG. 9) and between designs (see 'b' of FIG. 9 to 'b2' of FIG. 11).

Illustrated in FIGS. 10 and 12 are additional webbing designs, wherein the openings 28 in the netting 11 are uniform and comprise a shape such as diamonds, squares, rectangles, or any other polygonal shape.

With specific reference to FIGS. 9 and 10, it is also evident that the cover may be specifically configured to accommodate different mobile device configurations. For example, the covers in FIGS. 9 and 10 are designed and configured to accommodate different camera 32 positions, sizes, and shapes on the mobile devices, and differing locations of the various buttons on the mobile device.

Figure 14:
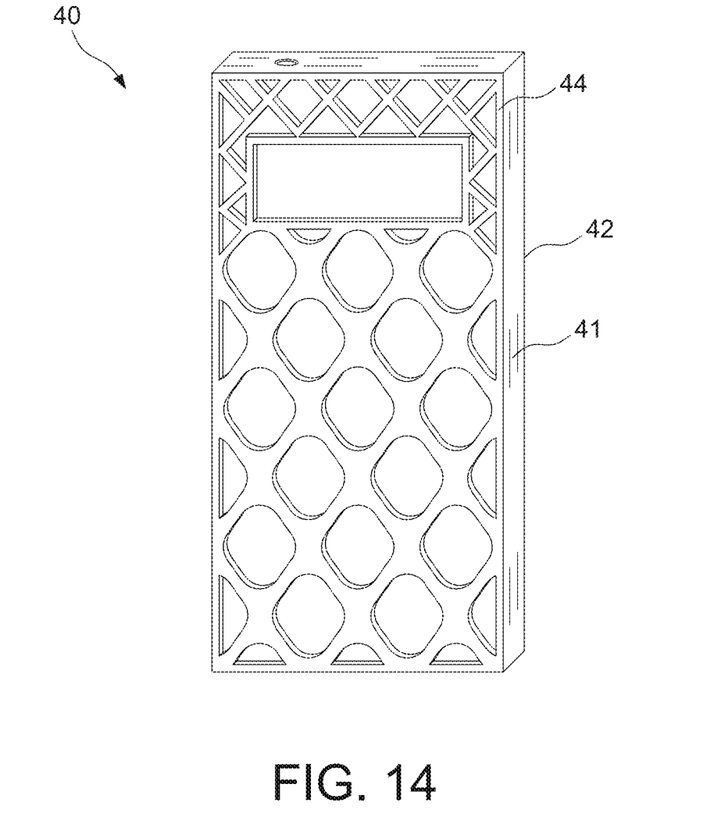
FIG. 14 illustrates a back view of a case according to aspects of the present disclosure.

The presently disclosed invention also provides a case that comprises a flexible netting material, and thus offers the same enhanced functionality described hereinabove in relation to the cover. The case 40 may include a body portion having a side wall 41 configured to extend around a perimeter of a mobile electronic device. The side wall includes a front perimeter 42 and/or lip 43 extending from the side wall and positionable adjacent a front screen portion of the mobile electronic device. The side wall further includes a rear perimeter 44. The flexible netting material (not shown) may be attached along either the front perimeter 42 or lip 43 or rear perimeter 44 of the side wall 41 and extends about a back side thereof. The body portion and flexible netting material are configured to provide removeable attachment of the case about the mobile electronic device such that the front screen portion is substantially uncovered.

According to certain aspects, the case 40 may further include a back panel 45 extending from the rear perimeter 44 of the body portion, wherein the flexible netting is disposed over the back panel (not shown). As indicated, the flexible netting may be attached along a front perimeter 42 or a rear perimeter 44 of the side wall 41. The flexible netting material is generally configured to accept a user's fingers through the mesh openings. The webbing thickness and diameter may be as described hereinabove for the cover. Moreover, the netting material may comprise a flexible polymer, such as described hereinabove (i.e., any of the exemplary polymeric materials listed above).

According to certain aspects, the side wall 41 and/or back wall 45 may comprise a flexible polymer that is the same or different than the flexible polymer of the netting material. Alternatively, the side wall and/or backwall may be formed of a less flexible polymeric material, such as a material having a durometer of greater than 60A (shore A) or at least 20D (shore D).

For example, the side wall and/or back wall may comprise a polymeric material having a durometer of at least 50A (Shore A hardness), such as at least 55A, at least 60, at least 65A, at least 70A; or up to 75A, up to 70A, up to 65A, up to 60A, up to 55; or any combination of lower and upper limit of Shore A hardness (e.g., from 50A to 70A, etc.). The side wall and/or back wall may have a Shore D hardness of at least 20D, such as at least 25D, at least 30D, at least 35D, at least 40D, at least 45D, at least 50D, at least 55D; or up to 60D, up to 55D, up to 50D, up to 45D, up to 40D, up to 35D, or up to 30D, or up to 25D; or any combination of upper and lower limit of Shore D hardness.

The case 40 may generally be configured as a case for a cellular phone, a tablet computer, an electronic gaming system, a digital music player, a global positioning system, and combinations thereof. Portions of the flexible netting material and/or the body portion may be removed to accommodate access points on the mobile electronic device when the case is installed therein.

The covers and cases disclosed herein may be augmented by adding key rings, rings, S-hooks, charms, carabiners, etc., to clip to clothing or other structures like a shower door or a doorknob or a car vent and would not interfere with newly attached or previously installed accessories (e.g., Pop Socket).

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

What is claimed is:

1. A stretchable net cover for a mobile electronic device, the cover comprising:
   a body comprising a webbing, wherein the webbing is configured to cover a back, sides, and at least a portion of a front of a mobile electronic device, and wherein the webbing comprises openings configured to accept a user's fingers therethrough; and
   a frame having a top edge, a bottom edge, and opposing side edges that define an opening in the body configured to expose a front screen region of the mobile electronic device,
   wherein the webbing of the body and the frame each comprise a flexible material that stretches to allow removeable attachment of the cover over the mobile electronic device such that the cover has at least two configurations, including,
   (i) an initial configuration in which the cover is separated from the mobile electronic device, wherein the top, bottom, and side edges of the frame have a first overall dimension, and the body is unstretched, and
   (ii) an installed configuration in which the cover is positioned around the mobile electronic device so that the body is stretched about the back and sides of the mobile electronic device, and the top, bottom, and side edges of the frame have a second overall dimension substantially the same as the first overall dimension.

2. The stretchable net cover of claim 1, wherein the body and frame are configured to provide removeable attachment of the cover over the mobile electronic device when it is enclosed in a case.

3. The stretchable net cover of claim 1, wherein the flexible material comprises a flexible silicone material.

4. The stretchable net cover of claim 1, wherein the webbing of the body and the frame comprise different flexible materials.

5. The stretchable net cover of claim 1, wherein the webbing comprises a webbing thickness of 0.2 mm to 2 mm.

6. The stretchable net cover of claim 5, wherein a thickness of the frame is greater than the webbing thickness.

7. The stretchable net cover of claim 1, wherein the openings in the webbing comprise a diameter of 0.5 cm to 7.5 cm.

8. The stretchable net cover of claim 7, wherein the openings in the webbing vary in diameter across a longitudinal extent of the body portion.

9. The stretchable net cover of claim 1, wherein the cover is configured to cover a cellular phone, a tablet computer, an electronic gaming system, a digital music player, a global positioning system, or combinations thereof.

10. The stretchable net cover of claim 1, wherein the frame is shaped to be coincident with a shape of the front screen region of the mobile electronic device.

11. The stretchable net cover of claim 1, wherein portions of the webbing of the body are removed to accommodate access points on the mobile electronic device when the cover is installed therein.

* * * * *